Dec. 24, 1935.  W. C. BROWN  2,025,641
DISTRIBUTOR
Filed Feb. 12, 1935
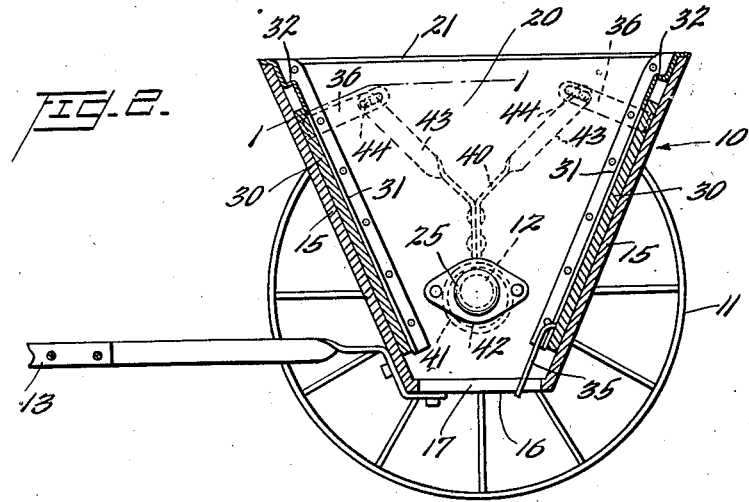
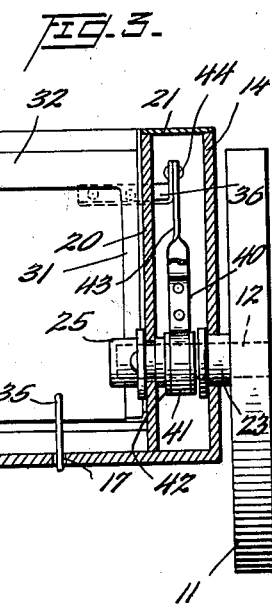
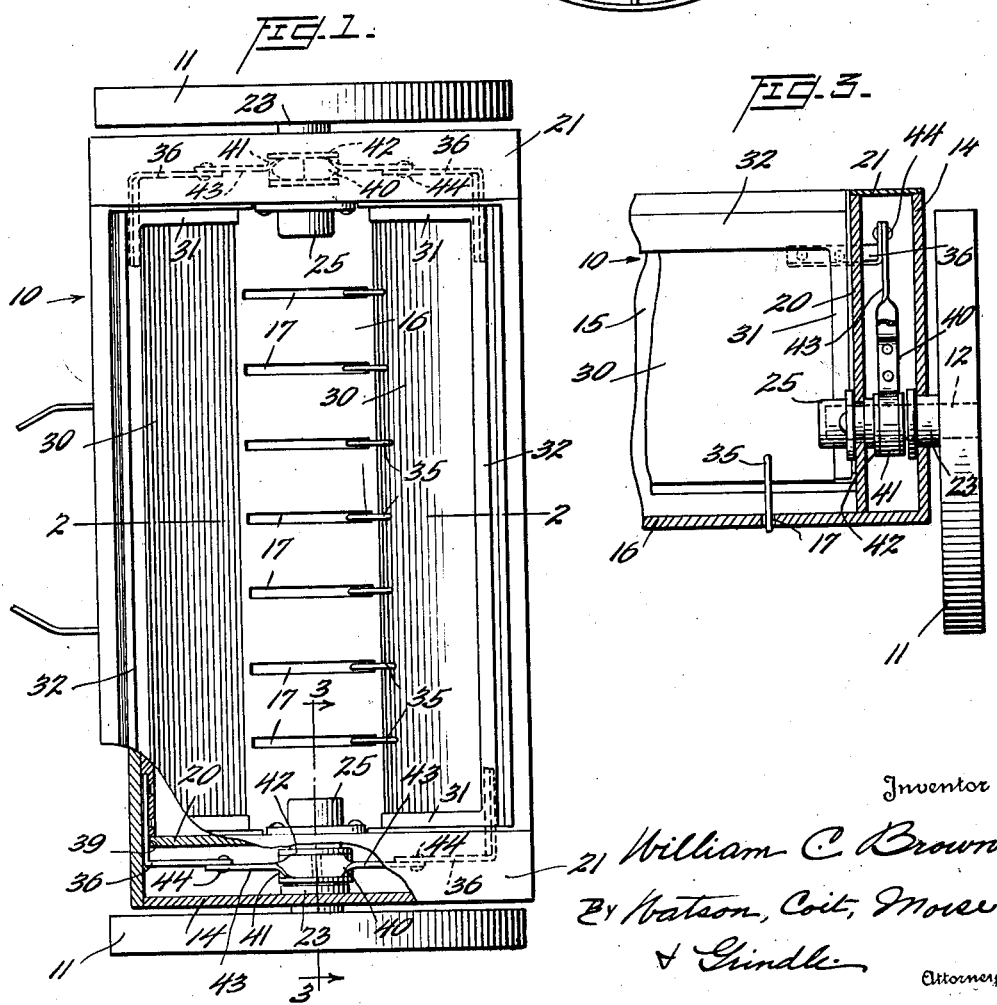
Inventor
William C. Brown
By Watson, Coit, Morse
& Grindle
Attorneys Patented Dec. 24, 1935

2,025,641

UNITED STATES PATENT OFFICE 2,025,641

DISTRIBUTOR

William C. Brown, Mohawk, N. Y.

Application February 12, 1935, Serial No. 6,248

9 Claims. (Cl. 275—2)

This invention relates to distributors and more particularly to distributors which may be employed as lime or fertilizer spreaders, grain drills, seeders or the like.

The general object of the invention is to provide a novel and improved distributor of this character.

A distributor of this class usually comprises a somewhat elongated hopper provided with outlet openings at the bottom and supported by ground wheels so that it may be drawn across the field or other area to be covered, treated, or marked with the material carried in the hopper. If the material, such as lime or fertilizer, is lumpy, the discharge openings of the distributors are liable to become clogged; and if the material is moist, it may cohere and "arch" in the hopper and cause a cessation of delivery through the bottom openings. This latter condition is especially prevalent in handling wet grain when the device is used as a drill or seeder.

It is therefore a more particular object of the invention to provide a distributor which may be employed to spread or scatter such pulverulent or granular material continuously without clogging or arching; and, pursuant to this purpose, the invention, in its preferred embodiment, contemplates the provision of means driven by the ground wheels of the distributor and operating within the hopper in association with the walls thereof to prevent the arching of the material, and means similarly driven and adapted to clear the outlet openings to obviate clogging.

Other objects and features of novelty will be apparent from the following specification when read in connection with the accompanying drawing in which one embodiment of my invention is illustrated by way of example.

In the drawing:

Figure 1 is a plan view of a device comprising one embodiment of my invention; a portion of one end thereof being shown in horizontal section taken substantially on line 1—1 of Figure 2;

Figure 2 is a vertical longitudinal sectional view taken on line 2—2 of Figure 1; and Figure 3 is a partial vertical transverse section taken on line 3—3 of Figure 1.

As illustrated in the drawing, the distributor comprises a transversely elongated hopper designated generally by the numeral 10 and supported for movement across the ground by the wheels 11 carried by the stub axles 12. Suitable draft mechanism may be provided such as the tongue indicated by the numeral 13.

The hopper 10 is provided with the end walls 14 and the downwardly converging forward and rear side walls 15. The bottom wall 16 of the hopper is provided with suitable discharge openings, of which the slots 17 are illustrative examples. A suitable lid or cover for the hopper may be provided if desired. Inner walls or partitions 20 are provided at the ends of the hopper to form a housing for certain operating mechanism which will be described. Covers 21 may be provided for the housing thus formed. These partitions 20 also provide means for journalling the stub axles 12. A sleeve-like bearing member 23 is positioned within an opening formed in each of the end walls 14 and a flanged bearing cap 25 is secured to the partition 20 for receiving the inner end of the stub axle. It will be readily understood that any suitable bearings and flanges or other retaining means for the stub axles may be employed within the scope of the invention.

The mechanism for insuring a constant feed of material from the hopper will now be described. A pair of oscillatable plates 30 is provided, each of which is adapted to slide along one of the front or rear walls 15 of the hopper. In effect, these plates provide movable inner walls for the hopper. The plates 30 are guided at their ends by means of the flanged members 31 and are shrouded at their upper edges by means of the members 32 which are secured to the upper edges of walls 15 and provide a closed space within which the upper edge of the plates may move. The lower edges of sliding plates 30 are unobstructed and serve, during the substantially vertical oscillation of the plates, to aid in feeding the material. A series of prongs 35 is secured along the lower edges of either one or both of the sliding plates 30 and these prongs are adapted to project in the lower extent of their movement toward, into, or through the discharge openings or slots 17, depending upon the selected length of said prongs.

For the purpose of oscillating the plates they are provided substantially at their upper corners with rigid arms 36. These arms extend through slots 39 provided at the ends of the partitions 20 and are bent at right angles so as to extend toward the center of the hopper within the drive mechanism housing provided at the ends of the device. A substantially Y-shaped crank member 40 is provided at its lower end with a loop or band 41 which is adapted to enclose the flanged eccentric 42 which is keyed or otherwise rigidly secured to the stub axle 12, on each side of the distributor. The arms 43 of the crank member 40 are connected by means of pin and slot connections 44 with the arms 36. It will be readily perceived that as the stub axles rotate, the eccentric members 42 will cause the crank member 40 to perform an oscillatory movement which will be transmitted through the arms 36 to each end of the sliding plates 30. Thus during the progress of the distributor across the area to be treated, the plates 30 will be continually oscillated and the clearing prongs 37 projected toward and retracted from the openings 17, effectively preventing the clogging of these openings and the arching of the material across the hopper or the retention of the material on the walls thereof when the hopper is nearly emptied.

It will be apparent that various changes and modifications may be made in the device as illustrated and described herein without departing from the scope of the invention as defined in the following claims. Furthermore, the principles of the invention may be applied to hoppers of various types and the clearing and feeding mechanism may be embodied in hoppers employed for different purposes, whether they are stationary or adapted to travel along the ground.

Having thus described the invention, what is claimed as new and desired to be secured by Letters Patent is:

1. A distributor for pulverulent or granular materials comprising a hopper having a plurality of bottom discharge openings, downwardly convergent oscillatable walls, a plurality of clearing prongs projecting downwardly toward said bottom discharge openings from at least one of said walls and adapted to move toward and from said openings to prevent clogging of the same, and means for oscillating said walls and said clearing prongs to insure a constant feed of material through said opening.

2. A portable distributor for pulverulent or granular materials comprising a hopper, supporting wheels and rotatable axles therefor and converging oscillatable walls for said hopper, arms secured to said walls at each end thereof, eccentrics mounted on said axles, crank members operated by said eccentrics and each provided with a pair of arms, each arm being connected with one of said first named arms whereby said downwardly convergent walls may be oscillated to prevent clogging and arching of the material and insure a constant feed.

3. A portable distributor for pulverulent or granular materials comprising a hopper having a bottom discharge opening, downwardly converging oscillatable walls, and means for oscillating said walls in their own planes in the same substantially vertical direction in unison whereby any arching of material in the hopper is prevented.

4. A portable distributor for pulverulent or granular materials comprising a hopper, supporting wheels therefor and downwardly converging oscillatable walls for said hopper, and means driven from said supporting wheels and operatively connected with said walls for oscillating said walls in the same direction upwardly and downwardly in unison.

5. A portable distributor for pulverulent or granular materials comprising a hopper, supporting wheels therefor and downwardly converging oscillatable walls for said hopper, and means driven from said supporting wheels and operatively connected with each end of each of said walls for oscillating said walls in the same direction upwardly and downwardly in unison.

6. A distributor for pulverulent or granular materials comprising a hopper having a bottom discharge opening, downwardly convergent side walls, substantially vertical end walls and movable plates slidable along said downwardly convergent walls to ensure a constant feed of material and prevent arching of the same, flanges secured to said end walls and adapted to overlap the side edges of said plates, and flanges secured to said convergent side walls adjacent the upper edges thereof and of sufficient width to overlie the upper margins of said slidable plates in all positions of oscillation, whereby obstruction of the movement of said plate by said material is prevented.

7. A distributor for pulverulent or granular materials comprising a wheeled hopper having a bottom discharge opening, downwardly convergent side walls, substantially vertical end walls and movable plates slidable along said downwardly convergent walls to ensure a constant feed of material and prevent arching of the same, end compartments exteriorly of said end walls, and actuating mechanism within said end compartments adapted to be driven by the supporting wheels and operatively connected with said sliding plates.

8. A distributor for pulverulent or granular materials comprising a wheeled hopper having a bottom discharge opening, downwardly convergent side walls, substantially vertical end walls and movable plates slidable along said downwardly convergent walls to ensure a constant feed of material and prevent arching of the same, end compartments exteriorly of said end walls, actuating mechanism within said end compartments adapted to be driven by the supporting wheels and operatively connected with said sliding plates through slots in said end walls, stub axles passing through said end compartments and adapted to carry the supporting wheels, eccentrics carried by said stub axles, and straps surrounding said eccentrics and operatively connected with said slides for oscillating the same.

9. A distributor for pulverulent or granular materials comprising a hopper having a plurality of bottom discharge openings, downwardly convergent oscillatable walls, a plurality of clearing prongs projecting downwardly from at least one of said walls, each of said prongs adapted to enter one of said discharge openings during the operation of the distributor to prevent clogging of said openings, and means for oscillating said walls and said clearing prongs to insure a constant feed of material through said openings.

WILLIAM C. BROWN.